(12) United States Patent
Oishi

(10) Patent No.: US 6,199,782 B1
(45) Date of Patent: Mar. 13, 2001

(54) DOUBLE BEARING TYPE FISHING REEL

(75) Inventor: Harumichi Oishi, Higashimurayama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/359,737

(22) Filed: Jul. 23, 1999

(30) Foreign Application Priority Data

Jul. 27, 1998 (JP) .................................................. 10-211171

(51) Int. Cl.$^7$ ................................................ A01K 89/015
(52) U.S. Cl. ........................... 242/312; 242/290; 242/315
(58) Field of Search .................................... 242/312, 314, 242/315, 310, 290

(56) References Cited

U.S. PATENT DOCUMENTS

| | | | |
|---|---|---|---|
| 1,363,817 | * 12/1920 | Schmid | 242/310 |
| 2,518,482 | * 8/1950 | Mandolf et al. | 242/312 |
| 5,086,991 | * 2/1992 | Johansson | 242/290 |
| 5,348,246 | * 9/1994 | Kim | 242/312 |
| 5,377,925 | * 1/1995 | Miyazaki | 242/312 |
| 6,012,666 | * 1/2000 | Hogaki et al. | 242/315 |
| 6,032,894 | * 3/2000 | Chapman et al. | 242/315 |

FOREIGN PATENT DOCUMENTS

| | | |
|---|---|---|
| 58-138332 | 8/1983 | (JP) . |
| 3-216138 | 9/1991 | (JP) . |

* cited by examiner

Primary Examiner—Katherine A. Matecki
(74) Attorney, Agent, or Firm—Oblon, Spivak, McClelland, Maier & Neustadt, P.C.

(57) ABSTRACT

A double bearing type fishing reel has a reel body including a frame with a rod attachment portion, and a pair of side plates disposed to face the frame. The reel also has a spool supported rotatably between the side plates, and a winding drive mechanism for rotating the spool. A removal prevention member is engaged with a peripheral portion of a projecting portion projecting from a surface of that side plate, which is provided on the side where the winding drive mechanism is provided. Thereby, this side plate is prevented from being removed from the frame.

2 Claims, 4 Drawing Sheets

DOUBLE BEARING TYPE FISHING REEL

BACKGROUND OF THE INVENTION

The present invention relates to a double bearing type fishing reel.

In the double bearing type fishing reel, a spool is rotatably supported between side plates of a reel body, and the spool is driven for winding a line by means of a handle provided on one of the side plates. As is disclosed in Jpn. Pat. Appln. KOKAI Publications Nos. 58-138332 and 3-216138, the reel body comprises a frame having a rod attachment portion, and a side plate (cover) mounted on a side portion of the frame. The side plate is fastened to the frame by means of small screws so as to cover a winding drive unit for the spool, which drive unit is provided on one side of the frame.

Since the side plate of the conventional double bearing type fishing reel is fastened to the frame by means of small screws, as mentioned above, the work for fastening is time-consuming. Moreover, since head portions of the small screws are exposed, the external appearance of the reel is degraded. Besides, since the head portions of the small screws are exposed, they are touched unpleasantly by the hand when the reel body is held, and a fishing line may easily be caught and tangled.

BRIEF SUMMARY OF THE INVENTION

The present invention has been made in consideration of the above problems, and an object of the invention is to provide a double bearing type fishing reel with enhanced operability in attaching a side plate to a frame as well as an improved external appearance. Another object of the invention is to provide a double bearing type fishing reel which is free of tangling of line and permits sure holding.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A double bearing type fishing reel according to an embodiment of the present invention will now be described with reference to the accompanying drawings.

Figure 1:
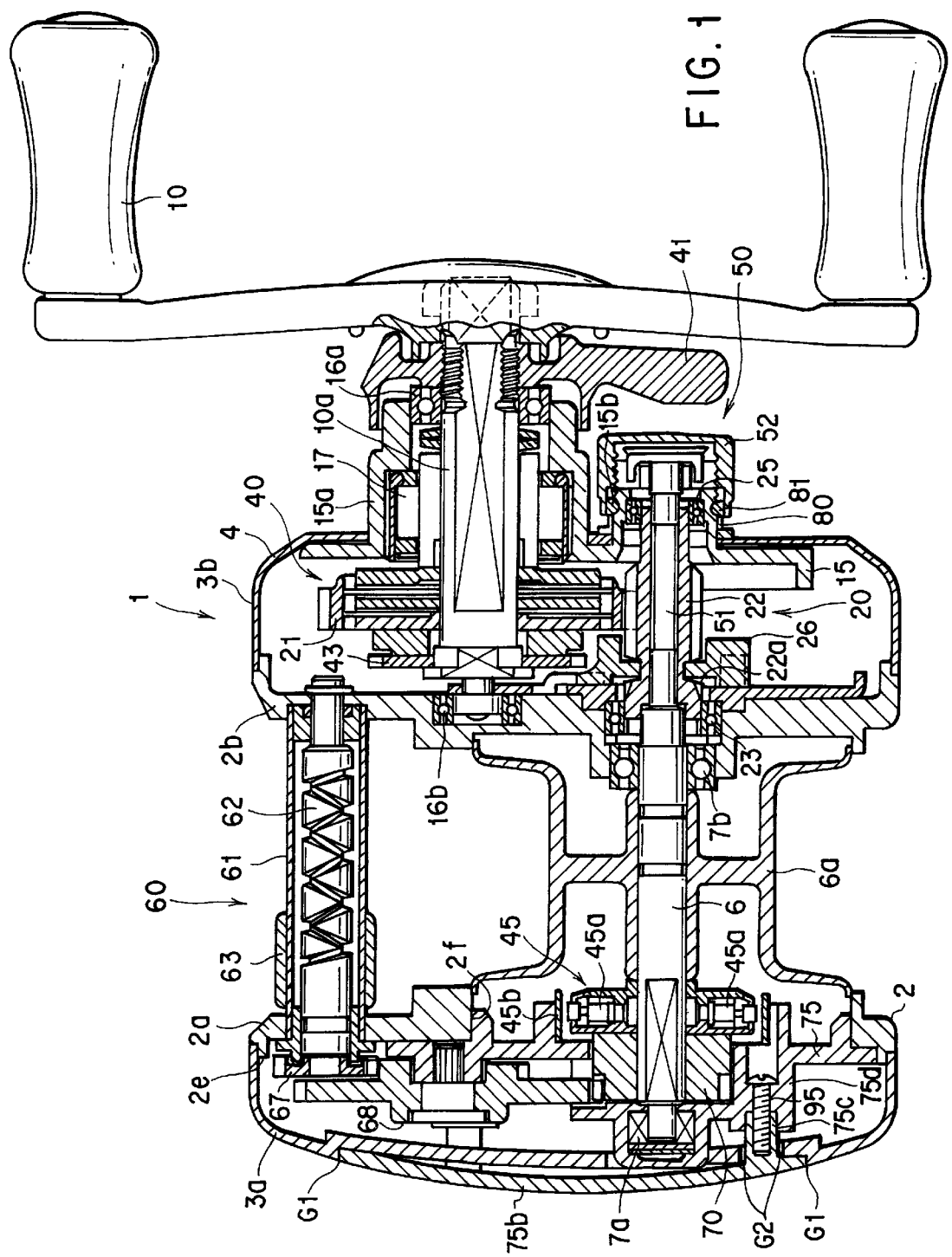
FIG. 1 is a partially cross-sectional plan view showing an internal structure of a double bearing type fishing reel according to an embodiment of the present invention.
Figure 2:
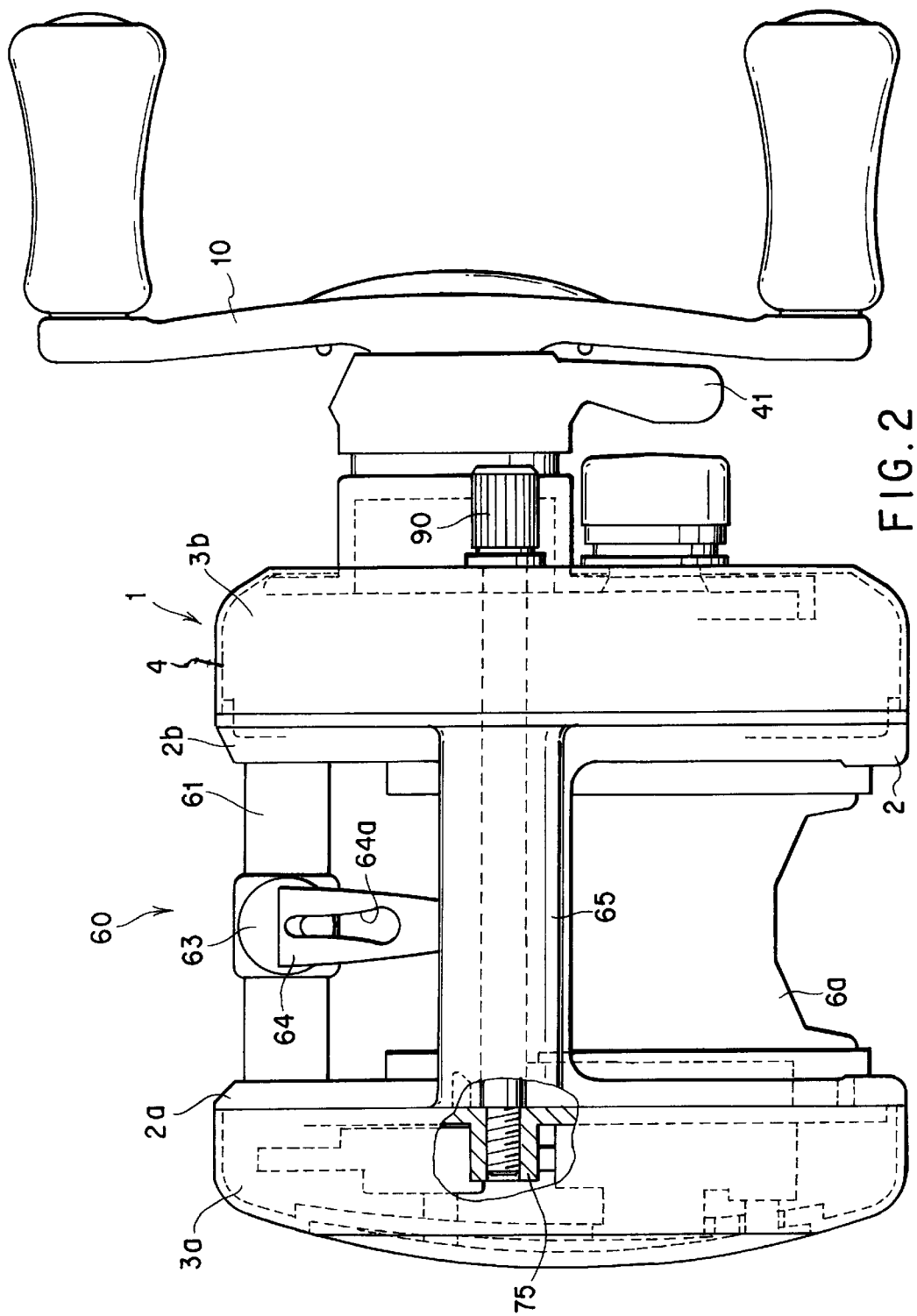
FIG. 2 is a plan view showing the double bearing type fishing reel shown in FIG. 1.

FIG. 1 is a partially cross-sectional plan view showing an internal structure of the double bearing type fishing reel, and FIG. 2 is a plan view of the reel.

A double bearing type fishing reel 1 has a reel body 4. The reel body 4 comprises a frame 2, a left-side plate 3a and a right-side plate 3b. The frame 2 comprises a left-side frame 2a, a right-side frame 2b, and a rod attachment portion 2c (see FIG. 4) formed integral to a central portion between the left-side and right-side frames 2a and 2b. The left-side and right-side plate 3a and 3b are attached to the left-side and right-side frames 2a and 2b, respectively.

A spool shaft 6, to which a spool 6a for winding a fishing line is attached, is rotatably supported between the left-side and right-side frames 2a and 2b (left-side and right-side plates 3a and 3b) by means of bearings 7a and 7b. The spool 6a is driven by rotating a handle 10 attached to an end portion of a handle shaft 10a projecting from the right-side plate 3b. In this embodiment, the handle shaft 10a is disposed in a cylindrical portion 15a projecting from a set plate 15 attached to the right-side frame 2b by means of a screw 13 (see FIG. 3A). The handle shaft 10a is rotatably supported on the cylindrical portion 15a and right-hand frame 2b by means of bearings 16a and 16b. The handle shaft 10a is rotatable in a line winding direction alone by means of a one-way clutch 17 interposed between the handle shaft 10a and the cylindrical portion 15a.

A winding drive mechanism 20 and a brake unit 40 of a drive mechanism are housed in a space defined between the right-side frame 2b and right-side plate 3b. The winding drive mechanism 20 transmits a torque of the handle 10 to the spool. When the line wound around the spool 6a is released by the caught fish, the brake unit 40 of the drive mechanism gives a frictional force to the line.

The winding drive mechanism 20 comprises a drive gear 21 rotatably supported on the handle shaft 10a, and a pinion gear 22 meshed with the drive gear 21. The pinion gear 22 is situated to be coaxial with the spool shaft 6. The pinion gear 22 is supported on the right-side frame 2b and set plate 15 by means of bearings 23 and 25, respectively. In this case, the bearing 25 is situated within a cylindrical portion 15b projecting from the set plate 15. A circumferential groove 22a is formed in an outer peripheral surface of the pinion gear 22. A clutch plate 26, which is axially driven by a clutch operating member (not shown), is engaged in the circumferential groove 22a. When the clutch operating member is actuated, the pinion gear 22 is moved to the right from a drive force transmission state (clutch-ON state) shown in FIG. 1 to a spool free rotation state (clutch-OFF state) in which the pinion gear 22 is disengaged from the spool shaft 6. The restoration from the clutch-OFF state to the clutch-ON state may be automatically effected by the winding operation of the handle 10, without performing an operation for restoring the clutch operation member.

The brake unit 40 of the drag mechanism has frictional plates and lining members. When a drag operation member 41 attached to a distal end portion of the handle shaft 10a is rotated, the brake unit 40 is pressed on the drive gear 21 in accordance with a pressing force proportional to the degree of rotation of the drag operation member 41. The pressing force acts on a ratchet 43 which rotates along with the handle shaft 10a. Thereby, a predetermined drag force occurs between the handle shaft 10a and drive gear 21.

A backlash prevention mechanism 45 for preventing excessive rotation of the spool 6a at the time of releasing the line is provided on the left-side plate side of the spool shaft 6. The backlash prevention mechanism 45 may be constructed in a centrifugal brake method, as shown in FIG. 1, wherein a radially movable slider 45a is put in contact with an annular friction member 45b by a centrifugal force produced by the rotation of the spool shaft 6. Alternatively, the backlash prevention mechanism may be constructed in a magnet method with use of a permanent magnet. The spool shaft 6 is engaged with a thrust-direction pushing mechanism 50 which acts in the thrust direction to absorb slight movement of the spool shaft 6 and give a braking force to the spool shaft 6. The pushing mechanism 50 comprises a thrust shaft 51 and a cap 52. The thrust shaft 51 is inserted in the pinion 22 and abutted upon an end face of the spool shaft 6. The cap 52 is screwed on the cylindrical portion 15b of set plate 15 to press the thrust shaft 51 in the thrust direction. By tightening the cap 52, the thrust shaft 51 is pressed upon the end face of the spool shaft 6, whereby slight movement of the spool shaft 6 is prevented and a desired frictional force is applied.

A level wind unit 60 is disposed between the left-side and right-side frames 2a and 2b in front of the spool 6a. The level wind unit 60 comprises a guide cylinder 61, a worm shaft 62, an engaging member 63 and a line guide 64. The guide cylinder 61 has an elongated hole (not shown) extending in the right-and-left direction in its lower surface portion. The worm shaft 62 is rotatably supported within the guide cylinder 61. The engaging member 63 is attached to the guide cylinder 61 so as to surround the guide cylinder 61 and is engaged with the worm shaft 62 via the elongated hole. The line guide 64 is attached to the engaging member 63 and has a line passage hole 64a. A distal end portion of the line guide 64 is engaged with a finger rest 65 attached between the right-side and left-side frames, thereby preventing the engaging member 63 from rotating around the guide cylinder 61.

A gear 67 is attached to an end portion of the worm shaft 62. The gear 67 is coupled via an intermediate gear 68 to a gear 70 attached to an end portion of the spool shaft 6. When the spool 6a is driven by the rotation of the handle 10, the engaging member 63 of the level wind unit 60 is moved in the right-and-left direction by means of the worm shaft 62 which is associated successively with the gears 67, 68 and 70 and spool shaft 6. The fishing line is evenly wound around the spool 6a via the line passage hole 64a in the line guide 64 of the engaging member 63 which is movable in the right-and-left direction.

In this embodiment, the annular friction member 45b, intermediate gear 68 and bearing 7a of spool shaft 6 are provided on the set plate 75 attached to the left-side frame 2a. Alternatively, these may be provided directly on the left-side frame 2a.

Figure 3B:
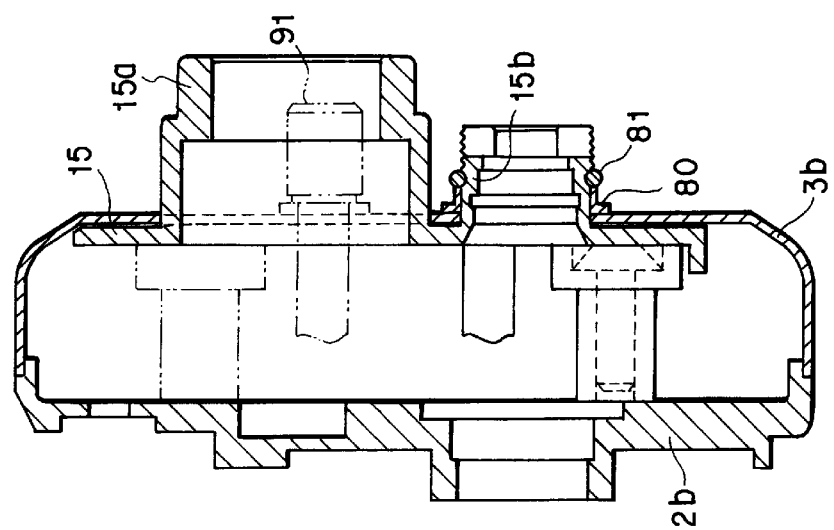
FIG. 3B shows a state in which the right-side plate has been mounted on the right-side frame.
Figure 3A:
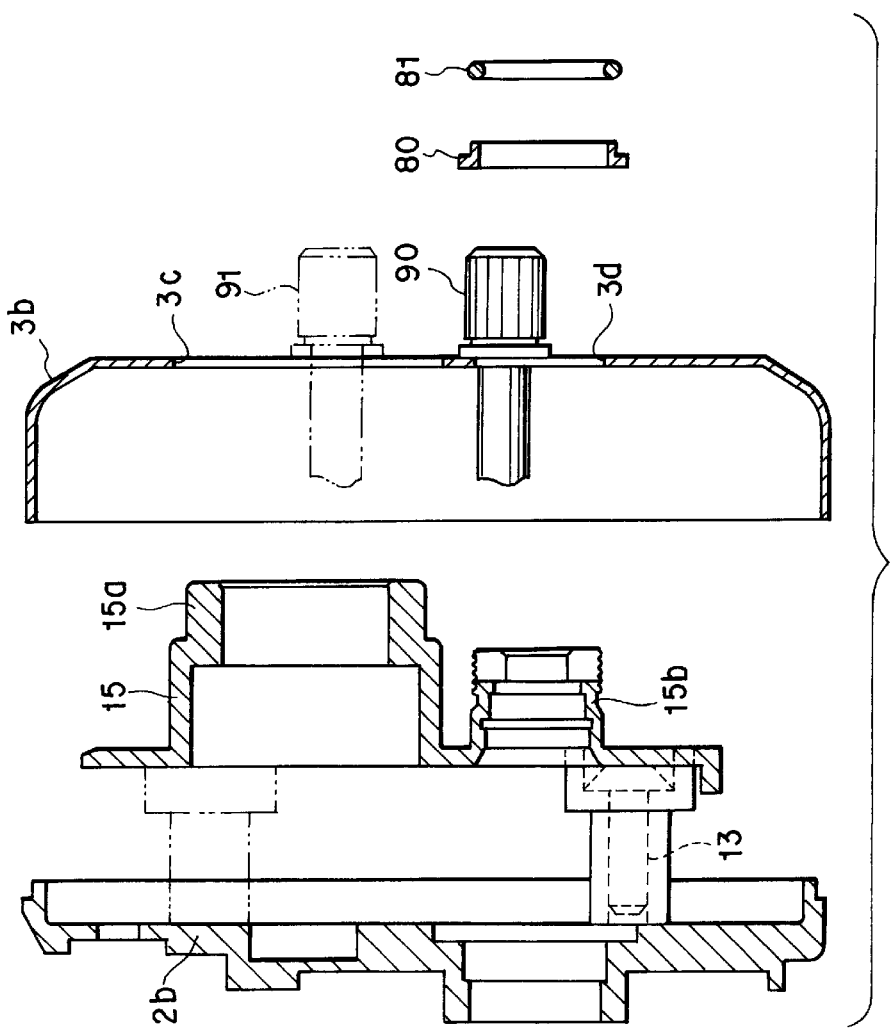
FIG. 3A shows a state before a right-side plate is mounted on a right-side frame.

The attachment structure between the frame 2 of the double bearing type fishing reel with the above structure and the set plates 15, 75 and left-side and right-side plates 3a, 3b will now be described with reference to FIGS. 1 to 4B. In FIGS. 3A and 3B, the handle shaft, winding drive mechanism and thrust-direction pushing mechanism are omitted.

As is shown in FIG. 3A, the set plate 15 is attached to the right-side frame 2b by means of a screw 13. The right-side plate 3b is attached so as to cover the set plate 15 attached to the right-side frame 2b. The right-side plate 3b has holes 3c and 3d at positions corresponding to the cylindrical portions 15a and 15b formed on the set plate 15. If the right-side plate 3b is attached to the right-side frame 2b, as shown in FIG. 3B, the cylindrical portions 15a and 15b of the set plate project from the surface of the right-side plate 3b through the holes 3c and 3d. In this state, a collar 80 and a O-ring 81 are engaged with the outer periphery of the projecting cylindrical portion 15b, thereby preventing removal of the right-side plate 3b.

Figure 4A:
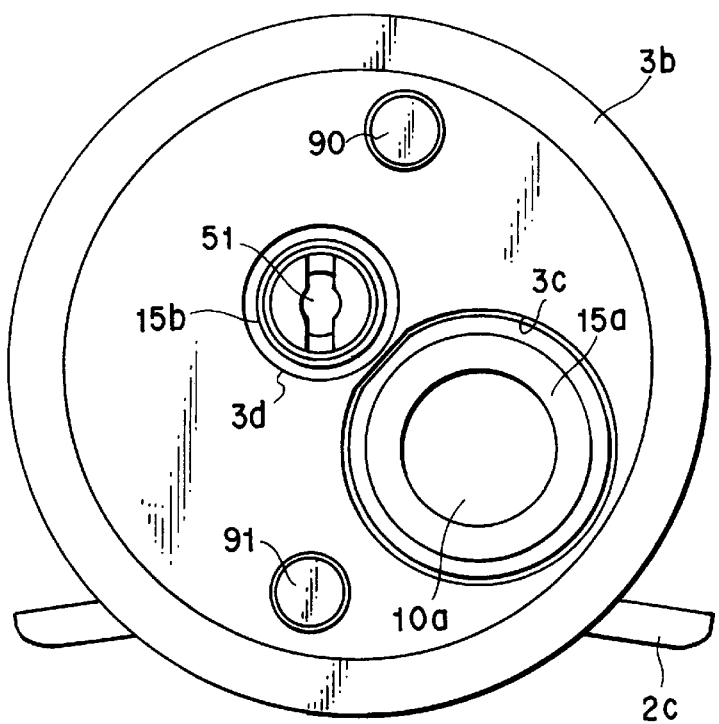
FIG. 4A shows a state in which the right-side plate has been mounted on the right-side frame.
Figure 4B:
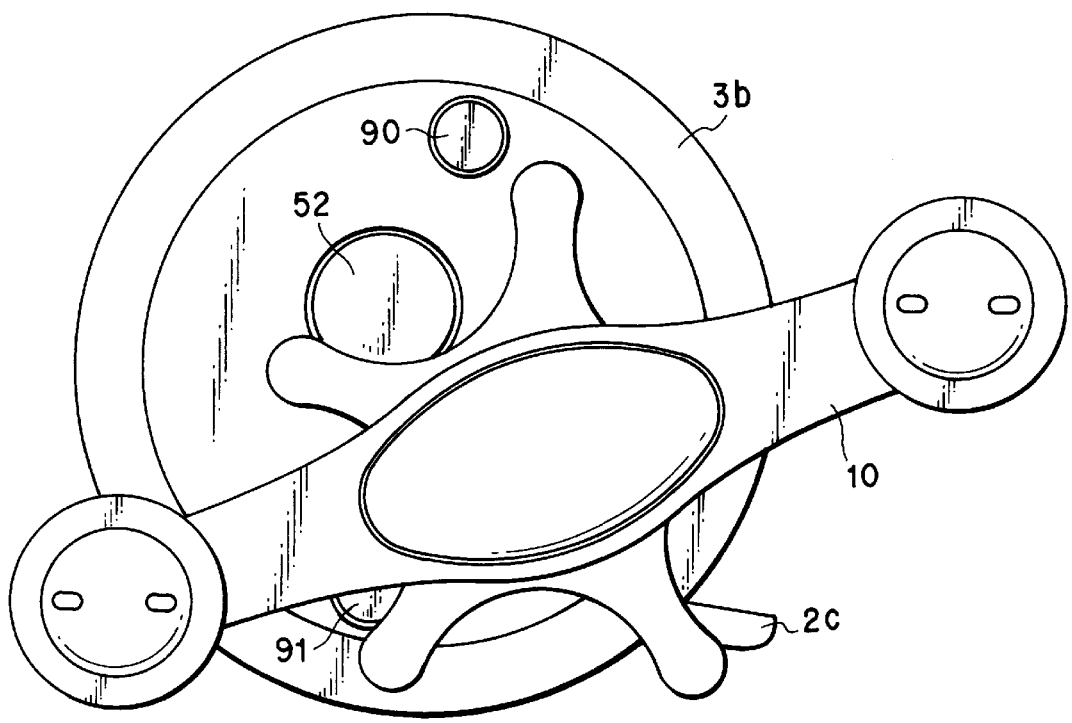
FIG. 4B shows a state in which a handle, etc. have been attached.

On the other hand, the left-side plate 3a, which is made integral with the set plate 75, is attached to the left-side frame 2a and firmly fixed by means of a plurality of setting screws 90 and 91 inserted from the side of the right-side plate. In this case, as shown in FIG. 2, the setting screw 90 provided upward is positioned on the lower side of the finger rest 65. The setting screw 91 provided downward is positioned on the lower side of the spool 6a, as shown in FIG. 4A.

Since the left-side plate 3a and set plate 75 are made integral and attached to an outer edge portion 2e of the left-side frame 2a and to an engaging hole 2f formed in the left-side frame 2a, it is necessary that the left-side plate 3a and set plate 75 be precisely positioned. With the structure described below, however, a positioning error between both can be corrected.

The set plate 75 comprises a set plate body 75a to be engaged with the engaging hole 2f in the left-side frame 2a, and a cover portion 75b to be engaged with the left-side plate 3a. A hole is formed in the left-side plate 3a, and a projection 75c formed on a rear surface of the cover portion 75b is inserted in this hole. The projection 75c is fixed in the hole by means of a screw 95. In this case, the left-side plate 3a and cover portion 75b are formed such that a slight gap G1 is provided between an outer peripheral portion of the cover portion 75b and an engaging portion of the left-side plate 3a, and a small gap G2 is provided between the left-side plate 3a and projection 75c. By virtue of this structure, when the setting screws 90 and 91 are fastened, a positional error can be absorbed by the gaps G1 and G2 and the left-side plate 3a and set plate 75 can be easily assembled with high precision.

As has been described above, when the right-side plate 3b is attached to the right-side frame 2b, the collar 80 and O-ring 81 are engaged with the outer periphery of the cylindrical portion 15b of set plate 15, which projects from the surface of the right-side plate 3b, thereby to prevent removal of the right-side plate 3b. Accordingly, unlike the prior art, there is no need to provide a small screw for fixing the right-side plate and disassembly and assembly of the reel body can be easily performed. In addition, since such a small screw is not provided, the external appearance of the reel is improved and side plate is formed flush. When the reel is held, good feeling of touch is attained. Moreover, the line is prevented from being caught by such a screw.

The present embodiment has been described. The present invention is not limited to this embodiment, the structure of the invention can be modified as described below.

The location of attachment of the removal prevention members (collar 80, O-ring 81) is not limited to the cylindrical portion 15b at which the thrust-direction pushing mechanism 50 is provided. The removal prevention members may be attached to the cylindrical portion 15a accommodating the handle shaft 10a, or to a projecting portion which may be provided on the set plate 15 when necessary.

In the above embodiment, the cylindrical portion, which projects from the surface of the right-side plate and at which the removal prevention members are provided, is formed on the set plate 15. However, the cylindrical portion may be formed directly on the right-side frame 2b. Alternatively, a projecting portion projecting from the surface of the right-side plate may be formed coaxial with the setting screw 90, 91, and the removable prevention members may be attached to this projecting portion. In this case, the set plate 15 may be omitted.

In the above embodiment, as regards the means for fixing the left-side plate 3a, the setting screws 90, 91 are inserted from the side of the right-side plate 3b. However, the setting screws 90, 91 may be inserted from the side of the left-side plate 3a, thereby to fix the left-side plate.

In the above embodiment, the removal prevention members attached to the cylindrical portion comprise the collar and O-ring. However, the O-ring alone may be used. Alternatively, without using the O-ring, a female screw-thread may be formed on the collar and it may engaged with a male screw-thread formed on the cylindrical portion.

Furthermore, the structures and positions of the drag mechanism, backlash prevention mechanism, level wind unit, and winding drive mechanism constituting the drive force transmission unit, which are all provided in the reel body, may be variously modified, other than those shown in the drawings.

As has been described above, in the present invention, the side plate on which the winding drive mechanism is provided is fixed to the frame by making use of the projecting portion projecting from the surface of that side plate. Accordingly, there is no need to provide a small screw for fixing the side plate to the frame. Thus, disassembly and assembly of the reel body can be easily performed. In addition, since such a small screw is not provided, the external appearance of the reel is improved and the side plate is formed flush. When the reel is held, good feeling of touch is attained. Moreover, the line is prevented from being caught by such a screw.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fishing reel comprising:

a reel body including a frame with a rod attachment portion, and a pair of side plates disposed to face the frame;

a spool shaft having an end face, supported rotatably between said side plates;

a spool, attached to said spool shaft, for winding a fishing line;

a winding drive mechanism for rotating the spool, said winding drive mechanism including a drive shaft being disposed coaxial with the spool shaft and being provided on a side of a predetermined side plate, which is one of said pair of side plates;

a projecting portion projecting from a surface of said predetermined side plate which is attached to thc frame on the side where the winding drive mechanism is provided, said projecting portion being a cylindrical portion having an engaging portion in an outer periphery thereof, said projecting portion being detachably attached to one side of the frame with screws and formed as a support frame for supporting the drive shaft of the winding drive mechanism;

a pressing mechanism provided with the cylindrical portion, for pressing the drive shaft against the end face of the spool shaft; and a removal prevention member, including an annular member attached to thc engaging portion of the cylindrical portion, for preventing the predetermined side plate for which the winding drive mechanism is provided from being removed from the frame.

2. The fishing red according to claim 1, wherein said removal prevention member has an elastic member.

* * * * *